Jan. 6, 1925.
J. L. MORRIS
AUTOMATIC WEIGHING APPARATUS
Filed March 23, 1923    2 Sheets-Sheet 1
1,521,702
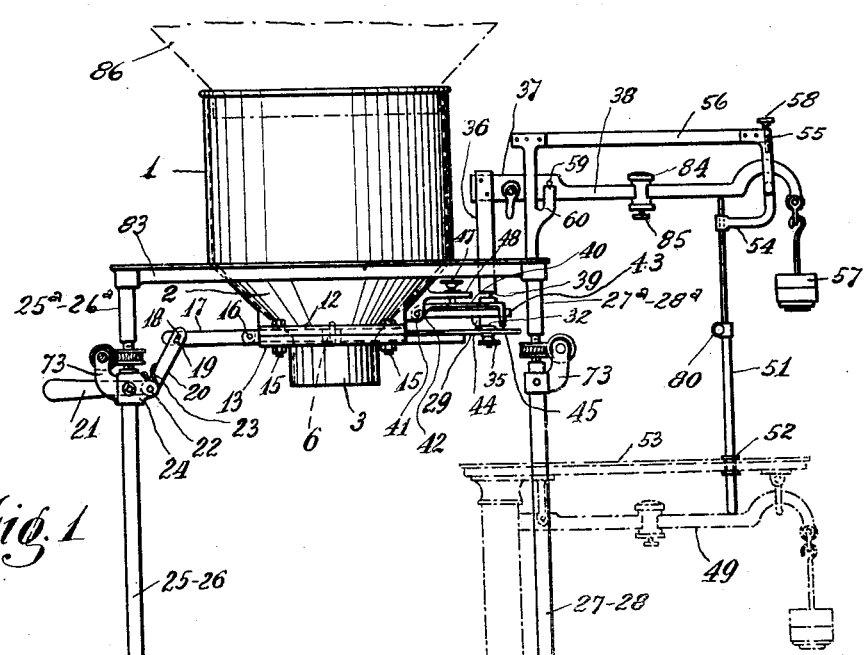
Fig. 1
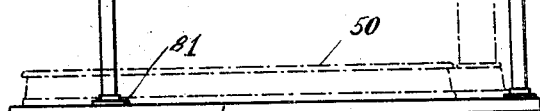
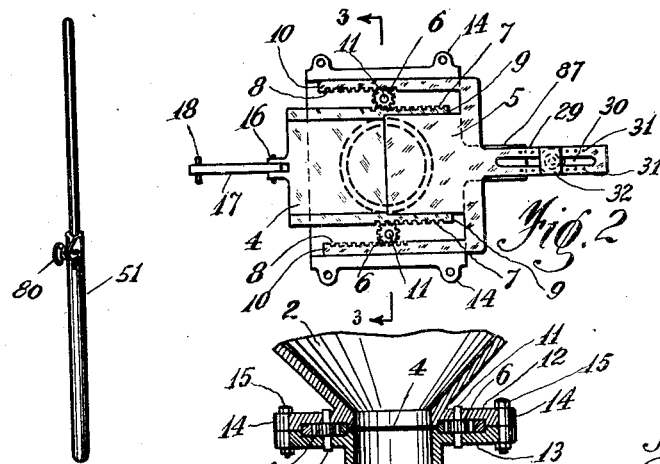
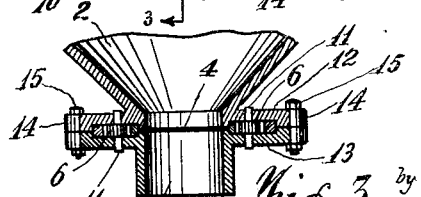
INVENTOR
Jolly L. Morris
by Ralph Kenrath and
Paul Suchard
Attorneys Jan. 6, 1925.
1,521,702
J. L. MORRIS
AUTOMATIC WEIGHING APPARATUS
Filed March 23, 1923    2 Sheets-Sheet 2
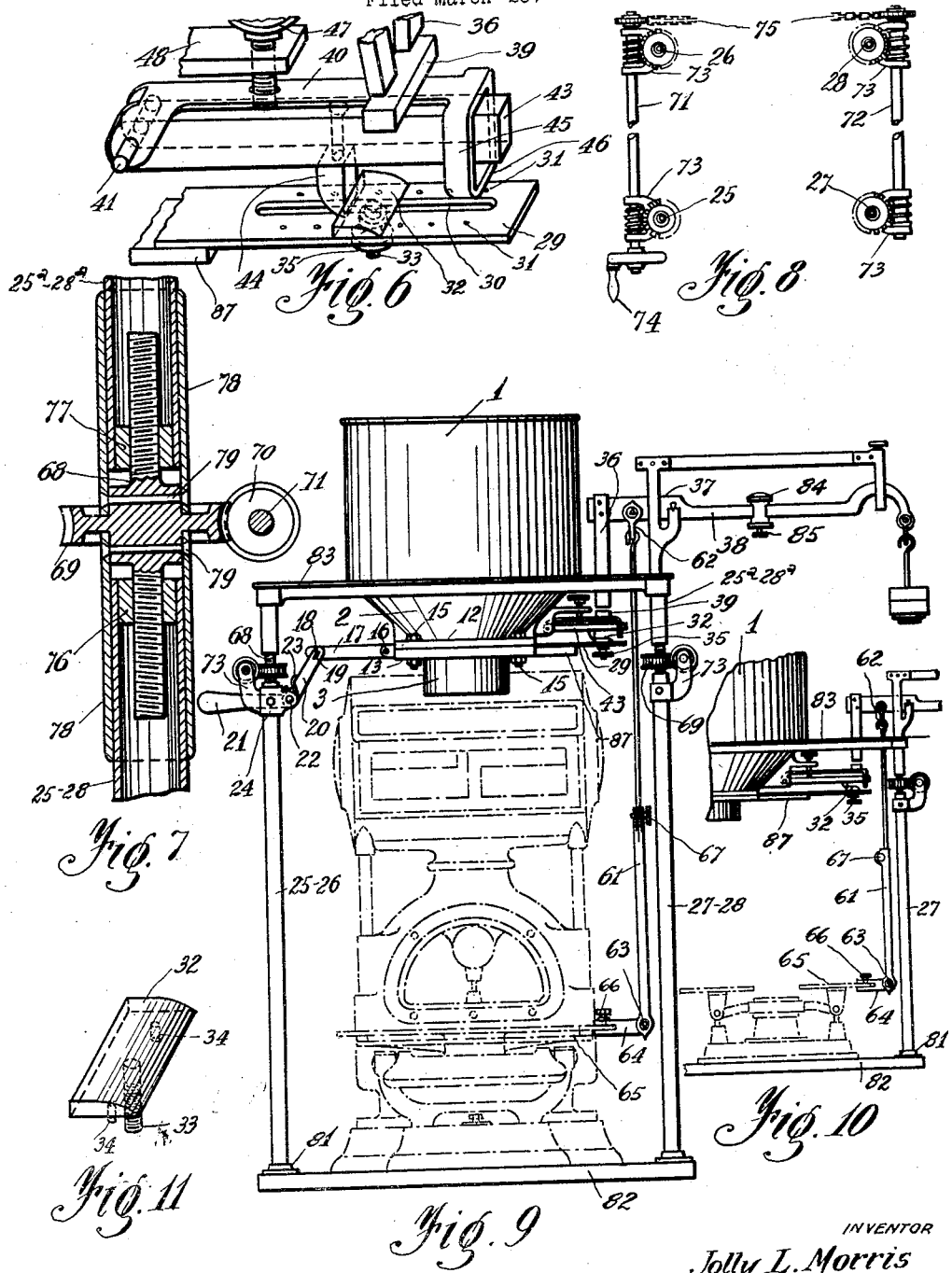
INVENTOR
Jolly L. Morris Patented Jan. 6, 1925.

1,521,702

UNITED STATES PATENT OFFICE.

JOLLY L. MORRIS, OF CRAFTON, PENNSYLVANIA, ASSIGNOR OF FIFTY-ONE PER CENT TO A. B. COLEMAN, OF PITTSBURGH, PENNSYLVANIA.

AUTOMATIC WEIGHING APPARATUS.

Application filed March 23, 1923. Serial No. 627,043.

*To all whom it may concern:*

Be it known that I, JOLLY L. MORRIS, a citizen of the United States, residing at Crafton, in the county of Allegheny and State of Pennsylvania, have invented certain new and useful Improvements in Automatic Weighing Apparatus, of which the following is a specification.

This invention relates to new and useful improvements in weighing scales and more in particular to automatic weighing apparatuses to be used in combination with ordinary counter scales.

One of the main objects of this invention is to provide an auxiliary weighing apparatus which can be readily operated in connection with an ordinary weighing scale, to transform the latter into an automatic weighing scale, capable of weighing any predetermined quantity of any free flowing commodity in granular, powder or liquid form, as it is supplied from a hopper. Another object is to provide such an auxiliary apparatus which is adaptable to various sizes and types of ordinary weighing scales and which can be combined therewith very quickly. A further object is to provide an auxiliary weighing apparatus which is portable, self-contained and which is operated independently of any electrical source of energy. Still a further object is to provide such an apparatus which is of simple construction, accurate operation and which can be manufactured at relatively low cost. Additional features and advantages of this invention will appear from the following detailed description taken in connection with the accompanying drawings forming a part of this application.

In the drawings:

Fig. 1 is a side elevation of my auxiliary weighing apparatus used in connection with a counter platform scale of the usual commercial type.

Fig. 2 is a top plan view showing the preferred construction of a shutter mechanism used in this apparatus.

Fig. 3 is a cross-sectional view taken substantially along line 3—3 in Fig. 2.

Fig. 4 is an end view showing the operating permanent magnet and its armature, used in my apparatus.

Fig. 5 is a perspective view showing an adjustable pushrod used in connection with counter platform scales only.

Fig. 6 is a fragmentary and enlarged view showing the shutter releasing mechanism of my apparatus.

Fig. 7 is a fragmentary cross-section view illustrating my preferred mechanism for adjusting the height of my apparatus to suit different sizes of scales or containers for the goods that are being weighed.

Fig. 8 is a fractional plan view showing one method of operating simultaneously the adjusting mechanism shown in Fig. 7 on the four supports of my auxiliary apparatus.

Fig. 9 is a side elevation showing the adaptation of my apparatus to a cylinder computing scale of a well known make.

Fig. 10 is a fractional side elevation showing the application of my apparatus to a so called even balance scale.

Fig. 11 is a perspective view showing a stop lug used in the shutter releasing mechanism illustrated in Fig. 6.

Referring to Fig. 1, especially, and to the various detail views, my auxiliary weighing apparatus consists of a hopper 1 having a frusto-conical bottom 2 terminated by a chute 3. Intermediate the bottom and the chute is mounted the shutter mechanism—best illustrated in Figs. 2 and 3. As seen therein, it comprises two sliding halves 4 and 5 which are arranged to move simultaneously and equally away or towards the center of the chute by means of the gear pinions 6 meshing into oppositely disposed racks 7 and 8 cut into the extensions 9 and 10 provided respectively on the shutter-halves 4 and 5. The pinions are mounted upon shafts 11 which are rotatably mounted in the flanges 12 and 13 of the hopper and chute respectively. These flanges are also suitably machined to provide a good sliding fit for both shutter-halves; they also have drilled lugs 14 for the reception of the clamping bolts 15. The outer end of the shutter-half 4 is provided with a centrally disposed bifurcated extension 16 in which is hingedly mounted the connecting rod 17 the outer end of which carries a pin 18 which engages the elongated slots 19 cut in the bifurcated end 20 of the bell-crank hand-lever 21. This lever is rotatably mounted upon a horizontal rod 22 and is acted upon by a spring 23, the tendency of which is to rotate the hand-lever in a clockwise sense, thereby forcing the shutter-half 4 towards the center of the chute. The horizontal rod 22 is fixedly mounted in two brackets 24 which are clamped on the supports 25 and 26, which, together with the supports 27 and 28 carry the complete auxiliary weighing mechanism.

The shutter-half 5 has a central extension 29 provided with a longitudinal slot 30 and two rows of equally spaced apertures 31. Upon this extension is slidably mounted and guided the stop-lug 32, beveled on the forward side and having a threaded central shank 33 and two pins 34 suitably spaced to engage the oppositely disposed apertures 31. The shank 33 engages the slot 30 and the stop-lug is secured in any desired position upon the extension by means of a clamping nut 35 engaging the shank 33.

The shutter releasing mechanism comprises a permanent magnet 36, preferably of the horse shoe type, which is secured at the rear end 37 of the auxiliary scale beam 38. The magnet armature 39 is secured on the armature lever 40, made of light material and hinged at its inner end upon a pin 41 driven in a support 42 secured or cast to the bottom 2. Upon said pin is also hingedly mounted the latch-lever 43 having at its underside a catch-finger 44, suitably shaped and located to engage the rear and straight vertical side of the stop lug 32. The armature lever 40 is terminated at its outer end with a downwardly directed elongated loop 45 which is engaged by the outer end of the latch-lever 43. The length of this elongated loop is such that it will enable a predetermined upward movement of the armature lever before the bottom bar 46 of the loop strikes the under side of the latch-lever 43. The upward motion of the latter is limited by means of a set screw 47 which is threaded in an extension 48 of the support 42.

The auxiliary scale beam 38 is freely connected to the scale beam 49 of the counter platform scale 50 by means of the adjustable telescoping push-rod 51 which rests on the upper side of the scale beam 49 and contacts with the underside of the auxiliary scale beam. The adjusted length of the push-rod is maintained by a clamping thumb screw 80. The lower end of the push-rod is guided by a suitable bushing 52 positioned in the top-board 53 of the platform scale, whereas the upper end of the push-rod is guided in a bracket 54 depending from the trig-loop 55 secured at the outer end of the horizontal beam support 56. The upward movement of the scale beam 49 will be communicated to the auxiliary scale beam 38 by the push-rod, while the downward movements of the auxiliary scale beam are taken care of by the counterpoise weights 57.

The upward movements of the auxiliary scale beam may be limited by the adjusting thumb screw 58 placed above the trig-loop 55.

The auxiliary scale beam is supported upon the knife-edge fulcrum 59 bearing upon the support 60 preferably mounted midway between the support 27 and 28.

The method of application of my auxiliary apparatus to computing scales and even balance scales, illustrated in Figs. 9 and 10 respectively, differs from the application just described only in that the auxiliary apparatus is connected in these scales directly with the loading plates thereof. The elimination of the adjustable push-rod 51 is made possible owing to the fact that the movements of the loading plates in computing and even balance scales is much greater than in platform scales, and therefore need not be multiplied to give adequate vertical travel to the permanent magnet 36.

In Figs. 9 and 10 I have shown my preferred method of connecting my apparatus; it consists of an adjustable, telescoping steelyard 61 suspended at its upper end from the steelyard knife and connecting link 62 and hingedly secured at its lower end by means of the knife edge connections 63 to a bifurcated arm 64 clamped in any desired manner to the edge of the loading plate 65, such as by the thumb-screw 66. Another thumb-screw 67 is used to hold the steelyard to its adjusted length.

The height of my auxiliary apparatus may be adjusted in many different ways known to the art. In the drawings I have shown the construction preferred by me owing to its self-locking nature. It consists of right and left hand threaded spindles 68 having at their middle worm-gears 69 meshing with helical worms 70 secured on shafts 71 and 72, supported in brackets 73 secured to the stationary supports 25 to 28 inclusive. These four sets of worm-drives may be operated simultaneously by means of a hand-wheel 74, and the chain and sprocket mechanism 75 shown in Fig. 8. The lower parts of the threaded spindles engage suitably threaded bushings 76 driven inside the tubular supports 25 to 28, and the oppositely threaded upper parts similarly engage bushings 77 secured within the separate but aligned tubular supports 25$^a$ to 28$^a$ inclusive. In Fig. 7 are also shown tubular guide-sleeves 78 which are secured on both sides of the worm-gears by the through pins 79 and which snugly fit around the above mentioned supports, thereby giving additional rigidity to the supports and improving the general appearance of the apparatus. The rigidity of the apparatus is furthermore increased by securing to the feet of the supports 25 to 28 the flanges 81 screwed to a solid base 82. The upper ends of the supports 25$^a$ to 28$^a$ are secured in any desired manner to the top plate 83 which supports the hopper 1.

The method of application and operation of my auxiliary apparatus is as follows: Assuming that a quantity of packages of a desired weight are to be weighed on the counter platform scale, shown in Fig. 1, a sample package having the desired weight is first placed on the platform scale, the poise 84 on the auxiliary scale beam is then moved back and forth until the permanent magnet 36 is brought close enough to the armature as to attract it suddenly. When the correct position of the poise has been determined, the latter is clamped to the auxiliary scale beam by means of the thumb-screw 85. The scale hopper 1 is now filled from the storage hopper 86 and the desired discharge opening for the sliding chute is determined by suitably locating the stop-lug 32 on the extension 29. The container to be filled is now placed upon the platform scale and the shutter is opened by pressing the hand-lever 21 downward; the chute will be kept open the desired amount by the catch-finger 44 engaging the rear end of the stop-lug. When the commodity reaches the required weight in the container, the movements of both scale beams will bring the permanent magnet close enough to the armature 39 for it to be suddenly attracted. As the bottom bar 46 of the loop 45 strikes the underside of the latch-lever 43, the catch-finger 44 will release the stop-lug 32 and the sliding shutter will immediately close under the influence of the spring 23 acting on the hand-lever 21, thus cutting off the supply from the hopper. The same filling operation is repeated for the succeeding packages.

The procedure for the scales shown in Figs. 9 and 10 is substantially the same, and does not, therefore, require additional explanation.

To prevent deformation of the extension 29, the latter is preferably supported in any desired manner. In the drawings a supporting strip 87, cast integrally with the flange 13 of the chute 3 has been shown for the purpose.

The present application is directed more particularly to the features of my invention involving the use of magnetic means. Certain of the broader features of the invention, including the construction of the shutter cutoff, are made the subject matter of my copending application Serial No. 700,019, filed March 18, 1924.

Many changes in the precise construction and arrangement of the various parts may be made without exceeding the scope of the claims, and I reserve the liberty of making all such changes as may be found desirable.

What I claim is:

1. In combination with a weighing scale, a portable supply hopper; a shutter for the discharge opening thereof; said shutter being composed of a front and rear abutting section oppositely and simultaneously slidable in a common plane; a hand-lever connected to said front section for opening said shutter; an extension secured centrally of said rear section having a stop-lug mounted thereon; a latch-lever; a catch finger secured thereto for engaging said stop-lug; an auxiliary scale beam; connecting means for imparting to said auxiliary scale beam the movements of said scale; a permanent magnet mounted upon said scale beam; magnet operated means for disengaging said catch-finger from said stop-lug, and spring operated means for closing said shutter.

2. In combination with a weighing scale, a portable supply hopper; a shutter for the discharge opening thereof; said shutter being composed of a front and rear abutting section oppositely and simultaneously slidable in a common plane; a hand-lever connected to said front section for opening said shutter; an extension secured centrally of said rear section having a stop-lug adjustably mounted thereon; a latch-lever; a catch-finger secured thereto for engaging said stop-lug; an auxiliary scale beam; connecting means for imparting to said auxiliary scale beam the movements of said scale; a permanent magnet mounted upon said scale beam; magnet operated striking means for disengaging said catch-finger from said stop-lug, and spring operated means for closing said shutter.

3. In combination with a weighing scale, a portable supply hopper; a shutter for the discharge opening thereof; said shutter being composed of a front and a rear abutting section oppositely and simultaneously slidable in a common plane; a hand-lever connected to said front section for opening said shutter; an extension secured centrally of said rear section having a stop-lug adjustably mounted thereon; a latch-lever; a catch-finger secured thereto for engaging said stop-lug; an auxiliary scale beam; connecting means for imparting to said auxiliary scale beam the movements of said scale; a permanent magnet mounted upon said scale beam; a hinged lever having a striking member for engagement and in spaced relation with said latch-lever; a magnet armature mounted upon said hinged lever, and spring operated means for closing said shutter.

4. In combination with a weighing scale, a portable supply hopper; a shutter for the discharge opening thereof; said shutter being composed of a front and a rear abutting section oppositely and simultaneously slidable in a common plane; a hand-lever connected to said front section for opening said shutter; an extension secured centrally of said rear section having a stop-lug adjustably mounted thereon; a latch-lever; a catch-finger secured thereto for engaging said stop-lug; an auxiliary scale beam; connecting means for imparting to said auxiliary scale beam the movements of said scale; a permanent magnet mounted upon said scale beam; a hinged lever having a striking member for engagement and in spaced relation with said latch-lever; a magnet armature mounted upon said hinged lever; spring operated means for closing said shutter, and means for limiting the upward movements of said latch-lever and auxiliary scale-beam.

5. In combination with a weighing scale, a portable supply hopper; a shutter for the discharge opening thereof; said shutter being composed of a front and a rear abutting section oppositely and simultaneously slidable in a common plane; a hand-lever connected to said front section for opening said shutter; an extension secured centrally of said rear section having a stop-lug adjustably mounted thereon; a latch-lever; a catch-finger secured thereto for engaging said stop-lug; an auxiliary scale beam; connecting means for imparting to said auxiliary scale beam the movements of said scale; a permanent magnet mounted upon said scale beam; a hinged lever having a striking member for engagement and in spaced relation with said latch-lever; a magnet armature mounted upon said hinged lever; spring operated means for closing said shutter; means for limiting the upward movements of said latch-lever and auxiliary scale-beam, and hand operated means for varying the height of said hopper above said scale.

6. In combination with a weighing scale: a portable supply hopper; a shutter for the discharge opening thereof; said shutter being composed of a front and a rear abutting section oppositely and simultaneously slidable in a common plane; a hand lever connected to said front section for opening said shutter; an extension secured centrally of said rear section having a stop-lug adjustably mounted thereon; a latch-lever; a catch-finger secured thereto for engaging said stop-lug; an auxiliary scale beam; connecting means for imparting to said auxiliary scale beam the movements of said scale; a permanent magnet mounted upon said scale beam; a hinged lever having a striking member for engagement and in spaced relation with said latch-lever; a magnet armature mounted upon said hinged lever; spring operated means for closing said shutter; means for limiting the upward movements of said latch-lever and auxiliary scale beam, and hand operated self-locking means for varying the height of said hopper above said scale.

In testimony whereof I affix my signature.

JOLLY L. MORRIS